US010070011B2

(12) United States Patent
Misaka et al.

(10) Patent No.: US 10,070,011 B2
(45) Date of Patent: Sep. 4, 2018

(54) IMAGE READING APPARATUS AND METHOD PROVIDING SHADING CORRECTION

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Naoyuki Misaka, Mishima Shizuoka (JP); Toshimitsu Ichiyanagi, Sunto Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/921,735

(22) Filed: Mar. 15, 2018

(65) Prior Publication Data

US 2018/0205850 A1    Jul. 19, 2018

Related U.S. Application Data

(63) Continuation of application No. 15/256,851, filed on Sep. 6, 2016, now Pat. No. 9,955,042.

(51) Int. Cl.
*H04N 1/40* (2006.01)
*H04N 1/409* (2006.01)
*H04N 1/193* (2006.01)
*H04N 1/028* (2006.01)

(52) U.S. Cl.
CPC ......... *H04N 1/4097* (2013.01); *H04N 1/0289* (2013.01); *H04N 1/193* (2013.01); *H04N 2201/0081* (2013.01)

(58) Field of Classification Search
CPC combination set(s) only.
See application file for complete search history.

(56) References Cited

U.S. PATENT DOCUMENTS 6,721,062 B1    4/2004  Sawada et al.
8,405,887 B2 *  3/2013  Oumi ................. H04N 1/00002
                                              358/461

(Continued)

OTHER PUBLICATIONS

Non-Final Office Action for U.S. Appl. No. 15/256,851 dated Aug. 28, 2017.

*Primary Examiner* — Barbara Reinier
(74) *Attorney, Agent, or Firm* — Amin, Turocy & Watson LLP (57) ABSTRACT

In accordance with an embodiment, an image reading apparatus comprises a sensor configured to read an image in a main scanning direction; a first reference plate; a second reference plate; and a processor configured to determine a parameter for shifting shading correction data on the basis of first reference data obtained through reading on the first reference plate by the sensor and second reference data obtained through reading on the second reference plate by the sensor, set the shading correction data on the basis of data obtained through the reading on the first reference plate by the sensor, acquire image data at each reading position in the sub-scanning direction by the sensor and carry out shading correction on the image data on the basis of the shading correction data shifted according to a shift amount at the each reading position obtained from the parameter.

7 Claims, 4 Drawing Sheets

(56) References Cited

U.S. PATENT DOCUMENTS

| | | | |
|---|---|---|---|
| 8,693,068 B2* | 4/2014 | Sakai | H04N 1/401 358/474 |
| 2012/0057210 A1* | 3/2012 | Tsukahara | H04N 1/00013 358/461 |
| 2012/0154876 A1* | 6/2012 | Shimoda | H04N 1/00013 358/453 |
| 2013/0001400 A1 | 1/2013 | Tanaka | |
| 2017/0237878 A1* | 8/2017 | Matsumi | H04N 1/4097 358/448 |

* cited by examiner

IMAGE READING APPARATUS AND METHOD PROVIDING SHADING CORRECTION

CROSS-REFERENCE TO RELATED APPLICATIONS

This application is a Continuation of application Ser. No. 15/256,851 filed Sep. 6, 2016, the entire contents of which are incorporated herein by reference.

FIELD

Embodiments described herein relate generally to an image reading apparatus and an image reading method.

BACKGROUND

An image reading apparatus such as a scanner enables a carriage to move under a fixed document to read the document. In the image reading apparatus which enables the carriage to move to read the document, due to an effect of variation of an assembly, there is a case in which an actual moving route of the carriage deviates from an intended moving route.

Further, in a case in which there is a foreign matter on a light ray from the carriage to a sensor, a dent is generated in a gain due to the foreign matter, which is detected by the sensor. If the actual moving route of the carriage deviates from the intended moving route, there is a case in which a position of the dent deviates together with movement of the carriage.

Thus, there is a problem that the image reading apparatus does not properly carry out shading correction for correcting defects caused by the foreign matter.

DETAILED DESCRIPTION

In accordance with an embodiment, an image reading apparatus comprises a sensor, a first reference plate, a second reference plate and a processor. The sensor reads an image in a main scanning direction. The first reference plate is formed in the main scanning direction. The second reference plate is formed in the main scanning direction at a position different from the first reference plate in a sub-scanning direction orthogonal to the main scanning direction. The processor determines a parameter for shifting shading correction data on the basis of first reference data obtained through reading on the first reference plate by the sensor and second reference data obtained through reading on the second reference plate by the sensor, sets the shading correction data on the basis of data obtained through the reading on the first reference plate by the sensor, acquires image data at each reading position in the sub-scanning direction by the sensor and carries out shading correction on the image data on the basis of the shading correction data shifted according to a shift amount at the each reading position obtained from the parameter.

Hereinafter, the embodiment is described with reference to the accompanying drawings.

The image reading apparatus according to the embodiment reads an image from a document arranged on a document table. The image reading apparatus is equipped with a carriage for reading the image in a main scanning direction. The image reading apparatus enables the carriage to move in a sub-scanning direction orthogonal to the main scanning direction to read the whole of the document.

Figure 1:
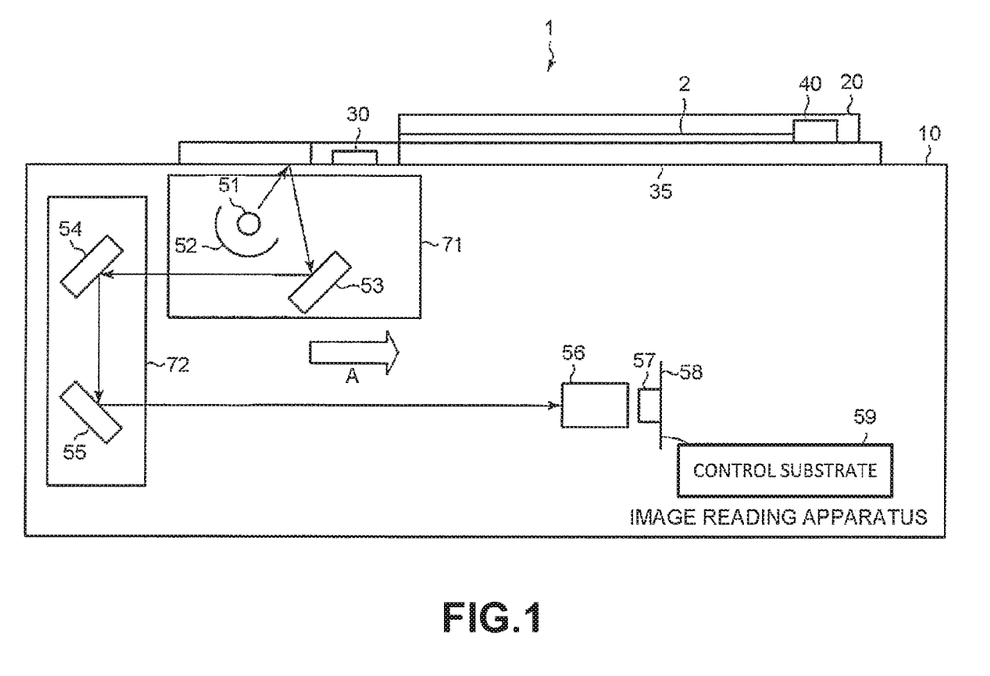
FIG. 1 is a diagram illustrating an example of a cross-sectional view of an image reading apparatus according to an embodiment.

FIG. 1 illustrates a cross-sectional view of an image reading apparatus 1.

As shown in FIG. 1, the image reading apparatus 1 is equipped with a housing 10, a document cover 20, a white reference plate 30, a document table glass 35, a distortion detection plate 40, a lens 56, a CCD sensor 57, a CCD sensor substrate 58, a control substrate 59, a first carriage 71 and a second carriage 72. The image reading apparatus 1 reads an image from a document 2.

The housing 10 constitutes contour of the image reading apparatus 1.

The document cover 20 is formed on the housing 10 and covers the document 2. For example, one fixed end of the document cover 20 is rotatably fixed on the housing 10. The document cover 20 exposes the document 2 if the other end thereof is lifted up.

The white reference plate 30 (first reference plate) is a colorful member assumed as white reference with respect to a read image of the CCD sensor 57. For example, the white reference plate 30 is a white plate formed into a rectangular shape. The white reference plate 30 is formed in the main scanning direction in which the first carriage reads an image. In other words, the white reference plate 30 is formed in a direction orthogonal to FIG. 1. Further, the white reference plate 30 is formed in the main scanning direction more widely than the width of the image acquired by the CCD sensor 57 in the main scanning direction.

The document table glass 35 is formed by a rectangular glass. The document table glass 35 loads the document 2. The document table glass 35 is formed with a larger size than the maximum document which can be read by the image reading apparatus 1. The document table glass 35 is formed in such a way as to being incorporated in the housing 10. In other words, the document table glass 35 enables light between the document 2 and the first carriage 71 to be transmitted.

The document table glass 35 is formed behind the white reference plate 30 in the sub-scanning direction (A direction in FIG. 1) in which the first carriage 71 moves. In other words, the first carriage 71 passes through the document table glass 35 after passing through the white reference plate 30.

The distortion detection plate 40 (second reference plate) is formed into a rectangular shape. The distortion detection plate 40 is formed inside the document cover 20 (in other words, at the side contacting with the document table glass 35). The distortion detection plate 40 is formed in the document cover 20 in the main scanning direction in which the first carriage 71 direction acquires the image. In other words, the distortion detection plate 400 is formed in the direction orthogonal to FIG. 1. Further, the distortion detection plate 40 is formed more widely in the main scanning direction than the width of the image acquired by the CCD sensor 57 in the main scanning direction.

The distortion detection plate 40 is, for example, a white plate or a black plate. The color of the distortion detection plate 40 is not limited to a predetermined configuration.

The distortion detection plate 40 is formed behind the document 2 in the sub-scanning direction (A direction in FIG. 1). In other words, the first carriage 71 passes through the distortion detection plate 40 after passing through the document 2. The distortion detection plate 40 is formed in the main scanning direction at a position different from the white reference plate 30 in the sub-scanning direction.

The distortion detection plate 40 may be formed on the document table glass 35. The distortion detection plate 40 may be formed under the document table glass 35. Further, the distortion detection plate 40 may be formed behind the document table glass 35 in the sub-scanning direction in the housing 10.

The first carriage 71 acquires the image in the main scanning direction orthogonal to FIG. 1 from the document 2. The first carriage 71 acquires light in the main scanning direction and reflects the acquired light to the second carriage 72. The first carriage 71 formed in the housing 10 moves in the sub-scanning direction (A direction) along the top surface of the housing 10. The first carriage 71 is formed at a location at which the first carriage 71 can read the light reflected from the white reference plate 30, the document 2 and the distortion detection plate 40 when passing through the white reference plate 30, the document 2 and the distortion detection plate 40.

The first carriage 71 is composed of light source 51, a reflector 52 and a first mirror 53.

The light source 51 emits light illuminating the white reference plate 30, the document 2 and the distortion detection plate 40. For example, the light source 51 is an LED or a fluorescent lamp.

The reflector 52 assembles the light emitted by the light source 51 to a predetermined area. The reflector 52 focuses the light to an area at which the first carriage 71 acquires the image. For example, the reflector 52 is formed in a predetermined R to cover the light source 51. The inside of the reflector 52 reflects the light.

The first mirror 53 reflects the light from the predetermined area to the second carriage 72 at a predetermined angle. The first mirror 53 is formed in the first carriage 71 at a predetermined angle. The first mirror 53 reflects the light in a direction reverse to the A direction.

Necessary components may be properly added to the first carriage 71 or unnecessary components may be properly deleted from the first carriage 71.

The second carriage 72 reflects the light from the first carriage 71 to the lens 56.

The second carriage 72 is equipped with a second mirror 54 and a third mirror 55.

The second mirror 54 reflects the light from the first carriage 71 to the third mirror 55. The second mirror 54 is arranged at a height almost identical to the first mirror 53. The second mirror 54 reflects the light from the first mirror 53 downwards.

The third mirror 55 reflects the light from the second mirror 54 to the lens 56. The third mirror 55 is formed almost right under the second mirror 54. The third mirror reflects the light from the second mirror 54 in a direction almost parallel to the A direction.

Necessary components may be properly added to the second carriage 72 or unnecessary components may be properly deleted from the second carriage 72.

The lens 56 forms an image with the light from the second carriage 72 on the CCD sensor 57. The lens 56 is arranged at a position almost horizontal to the third mirror 55. The lens 56 forms an image with the light from the third mirror 55 on the CCD sensor 57.

The CCD sensor 57 converts the light from the lens 56 to an electrical signal. For example, the CCD sensor 57 is composed of a plurality of photoelectric conversion elements corresponding to every read image pixel in the main scanning direction. Each photoelectric conversion element of the CCD sensor 57 generates a signal corresponding to intensity of light and sends the generated signal to the CCD sensor substrate 58.

The CCD sensor substrate 58 controls the CCD sensor 57 according to a signal from the control substrate 59. The CCD sensor substrate 58 is described later.

The control substrate 59 controls the whole of the image reading apparatus 1. The control substrate 59 is described later.

Next, a control system of the image reading apparatus 1 is described.

Figure 2:
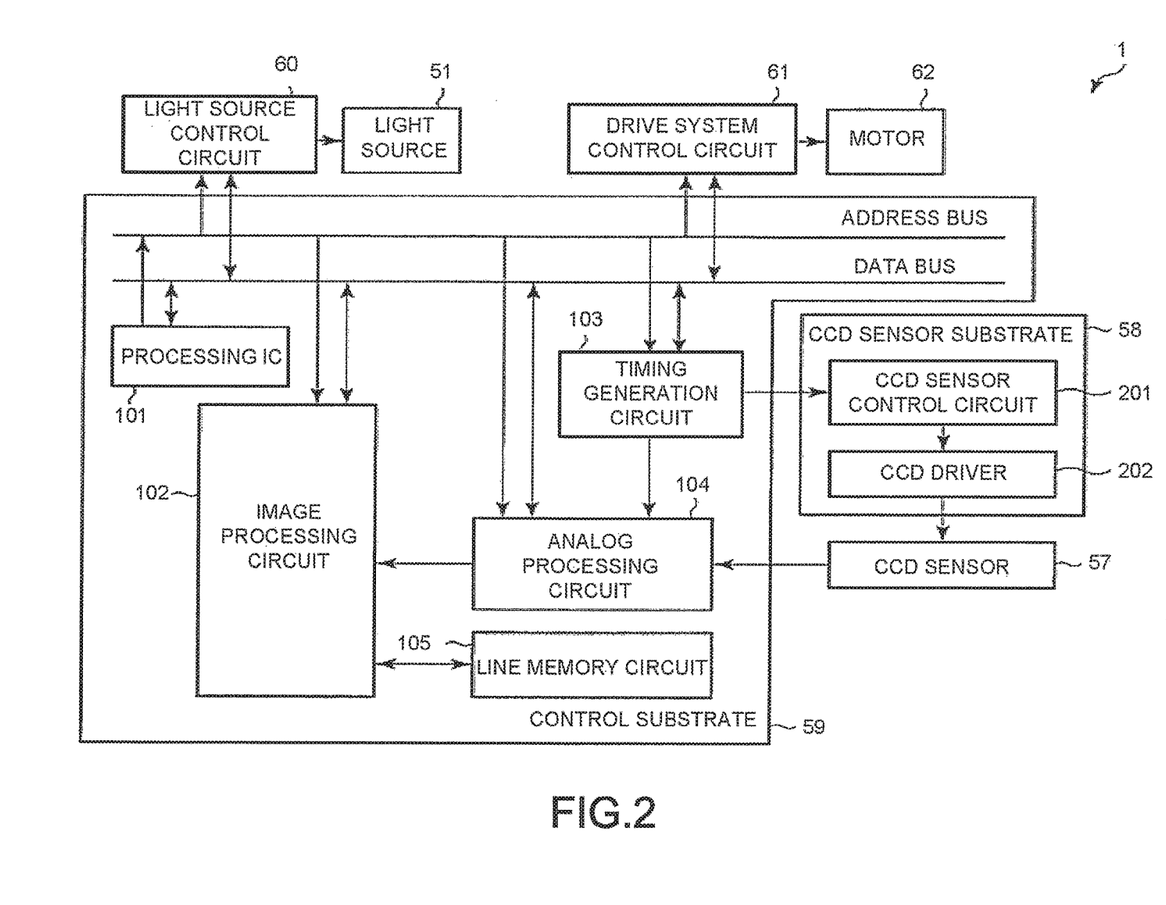
FIG. 2 is a block diagram illustrating an example of the configuration of the image reading apparatus according to the embodiment.

FIG. 2 is a block diagram illustrating the control system of the image reading apparatus 1.

As shown in FIG. 2, the image reading apparatus 1 is equipped with the light source 51, the CCD sensor 57, the CCD sensor substrate 58, the control substrate 59, a light source control circuit 60, a drive system control circuit 61 and a motor 62.

The control substrate 59 is equipped with a processing IC 101, an image processing circuit 102, a timing generation circuit 103, an analog processing circuit 104 and a line memory circuit 105. The processing IC 101 is connected with the light source control circuit 60, the drive system control circuit 61, the image processing circuit 102, the timing generation circuit 103, the analog processing circuit 104 and the line memory circuit 105 via a data bus and an address bus.

The light source control circuit 60 controls the light source 51 on the basis of the signal from the control substrate 59. For example, the light source control circuit 60 controls electric power supplied to the light source 51 on the basis of the signal from the control substrate 59.

The drive system control circuit 61 controls a drive system such as the motor 62 on the basis of the signal from the control substrate 59. For example, the drive system control circuit 61 supplies electric power or a pulse to the drive system such as the motor 62 on the basis of the signal from the control substrate 59.

The motor 62 enables the first carriage 71 to move on the basis of the electric power or the pulse from the drive system control circuit 61. The motor 62 is connected with the first carriage 71 via a gear or a belt to enable the first carriage 71 to move.

The processing IC 101 has functions of controlling operations of the whole of the control substrate 59. The processing IC 101 may be equipped with an inner cache and various interfaces. The processing IC 101 executes various processing by executing a program pre-stored in a memory which is not shown. The processing IC 101 is, for example, a processor or may be a CPU.

A part of various functions realized in such a manner that the processing IC 101 executes the program may be realized through a hardware circuit. In this case, the processing IC 101 controls the functions realized through the hardware circuit.

The image processing circuit 102 processes the image acquired by the CCD sensor 57. For example, the image processing circuit 102 sends the image acquired from the processing IC 101 to an external configuration.

The timing generation circuit 103 generates various kinds of timing. For example, the timing generation circuit 103 generates a timing at which the CCD sensor 57 starts acquisition of an image or a timing at which the CCD sensor 57 ends the acquisition of the image on the basis of a signal from the processing IC 101. The timing generation circuit 103 may output a pulse to notify a timing to the external configuration.

The analog processing circuit 104 processes an analog signal from the CCD sensor 57. For example, the analog processing circuit 104 converts the analog signal from the CCD sensor 57 to a digital signal and sends the digital signal to the image processing circuit 102.

The line memory circuit 105 stores a parameter on the basis of the signal from the processing IC 101. The parameter is described later.

The CCD sensor substrate 58 is equipped with a CCD sensor control circuit 201 and a CCD driver 202.

The CCD sensor control circuit 201 controls a timing of driving the CCD sensor 57 according to the signal from the timing generation circuit 103.

The CCD driver 202 drives the CCD sensor 57 on the basis the signal from the CCD sensor control circuit 201. For example, the CCD driver 202 supplies the electric power to the CCD sensor 57 on the basis of the signal from the CCD sensor control circuit 201, Necessary components may be properly added to the image reading apparatus 1 or unnecessary components may be properly deleted from the image reading apparatus 1.

Next, the functions realized by the processing IC 101 are described.

Firstly, the processing IC 101 has a function of reading the white reference plate 30 through the CCD sensor 57 to acquire white reference data (first reference data).

For example, the processing IC 101 controls the motor 62 through the drive system control circuit 61 to enable the first carriage 71 to move to a position at which the white reference plate 30 can be read. The processing IC 101 reads the white reference plate 30 through the CCD sensor 57 to acquire image data of the white reference plate 30 as the white reference data. In other words, the processing IC 101 acquires a position gain of each position in the main scanning direction as the white reference data.

Further, the processing IC 101 has a function of specifying a position of a foreign matter (first foreign matter position) on the basis of the white reference data. In other words, the processing IC 101 specifies a position of a foreign matter adhering to any position between the white reference plate 30 and the CCD sensor 57 in the main scanning direction of the white reference data.

For example, the processing IC 101 specifies a position into which a value of a gain of the white reference data falls as the position of the foreign matter. For example, the processing IC 101 averages the values of the gain of the white reference data. The processing IC 101 specifies the position into which the gain falls by a predetermined value or a predetermined rate according to the average value as the position of the foreign matter.

Further, the processing IC 101 has a function of reading the distortion detection plate 40 through the CCD sensor 57 to acquire distortion detection data (second reference data).

For example, the processing IC 101 controls the motor 62 through the drive system control circuit 61 to enable the first carriage 71 to move to a position at which the distortion detection plate 40 can be read. The processing IC 101 reads the distortion detection plate 40 through the CCD sensor 57 to acquire image data of the distortion detection plate 40 as the distortion detection data. In other words, the processing IC 101 acquires a position gain of each position in the main scanning direction as the distortion detection data.

Further, the processing IC 101 has a function of specifying a position of a foreign matter (second foreign matter position) on the basis of the distortion detection data. In other words, the processing IC 101 specifies a position of a foreign matter adhering to any position between the distortion detection plate 40 and the CCD sensor 57 in the main scanning direction of the distortion detection data. The method of specifying the foreign matter position of the distortion detection plate by the processing IC 101 is the same as the method of specifying the foreign matter position of the white reference plate by the processing IC 101.

Further, the processing IC 101 has a function of determining a parameter for shifting shading correction data used in shading correction on the basis of the foreign matter position of the white reference plate 30 and the foreign matter position of the distortion detection plate 40. In other words, the processing IC 101 determines a parameter for shifting shading correction data in accordance with deviation of the position of the foreign matter.

For example, the processing IC 101 calculates a distance between the foreign matter position of the white reference plate 30 and the foreign matter position of the distortion detection plate 40. The processing IC 101 determines a parameter as the parameter for realizing linear deviation of position of the foreign matter in the image data from the distance while the first carriage 71 moves between the white reference plate 30 and the distortion detection plate 40. In other words, the processing IC 101 determines a parameter for linearly combining the foreign matter position of the white reference plate 30 and the foreign matter position of the distortion detection plate 40.

For example, if the distance between the white reference plate 30 and the distortion detection plate 40 is set as L, the foreign matter position of the white reference plate 30 is set as WP, the foreign matter position of the distortion detection plate 40 set as DP, and a width (shift amount) of shifting the shading correction data is set as S, D is represented by the following equation.

$$S=(DP-WP)/L \times x \quad (1)$$

Herein, the position of the white reference plate 30 is assumed as 0, and the position of the first carriage 71 is assumed as x.

For example, the processing IC 101 calculates (DP-WP)/L as the parameter.

Furthermore, the method of determining the parameter by the processing IC 101 is not limited to a specify method.

The processing IC 101 stores the parameter in the line memory circuit 105.

Further, the processing IC 101 has a function of setting the shading correction data used in the shading correction.

The shading correction data is reference data to carry out the shading correction. The shading correction data includes shading correction data of white reference and shading correction data of black reference.

The shading correction data of black reference is data obtained by reading the predetermined area through the CCD sensor 57 in a state in which the light source 51 is turned off. For example, the processing IC 101 controls the light source control circuit 60 to turn off the light source 51. The processing IC 101 reads the image through the first carriage 71 located at the predetermined position (for example, at the position of the white reference plate 30) to acquire the image data in a state in which the light source 51 is turned off. The processing IC 101 generates the shading correction data of black reference on the basis of the read image data in a state in which the light source 51 is turned off.

Similarly, the shading correction data of white reference is generated on the basis of the white reference data.

The processing IC 101 has a function of reading the document 2 through the first carriage 71. In other words, the processing IC 101 acquires the image data from the CCD sensor 57.

For example, the processing IC 101 controls the motor 62 through the drive system control circuit 61 to enable the first carriage 71 to move towards the A direction. The processing IC 101 acquires the image data obtained by reading the document 2 through the first carriage 71 if the first carriage 71 moves to the predetermined position.

The processing IC 101 enables the first carriage 71 to move to acquire the image data at a predetermined interval.

Further, the processing IC 101 has a function of calculating a shift amount corresponding to a reading position on the basis of the parameter.

For example, the processing IC 101 calculates a shift amount corresponding to a reading position of the first carriage 71 on the basis of the parameter stored in the line memory circuit 105. For example, the processing IC 101 substitutes the reading position of the first carriage 71 in the equation (1) to calculate the shift amount.

Further, the processing IC 101 has a function of carrying out the shading correction on the image data on the basis of the shading correction data shifted according to the shift amount.

The processing IC 101 shifts the shading correction data according to the calculated shift amount. The processing IC 101 calculates a moving average of the shifted shading correction data. For example, the processing IC 101 enlarges the width of the moving average as the first carriage 71 advances in the A direction. In other words, the processing IC 101 reduces the width of the moving average in a case in which the first carriage 71 is close to the white reference plate 30. Further, the processing IC 101 enlarges the width of the moving average as the first carriage 71 approaches the distortion detection plate 40. For example, the processing IC 101 may set a width identical to or larger than the shift amount as the width of the moving average.

The processing IC 101 may set the width of the moving average to "1" (in other words, no moving average) in a case in which the first carriage 71 is close to the white reference plate 30.

The processing IC 101 carries out the shading correction on the image data on the basis of the shading correction data to which the moving average is carried out. The shading correction corrects uneven brightness generated due to characteristics of an optical system to acquire image data with the same brightness. For example, the processing IC 101 carries out the shading correction according to the following equation.

Corrected image data=(image data-shading correction data of black reference to which the moving average is carried out)/(shading correction data of white reference to which the moving average is carried out shading correction data of black reference to which the moving average is carried out) (2)

Next, examples of the white reference data and the distortion detection data are described.

Figure 3:
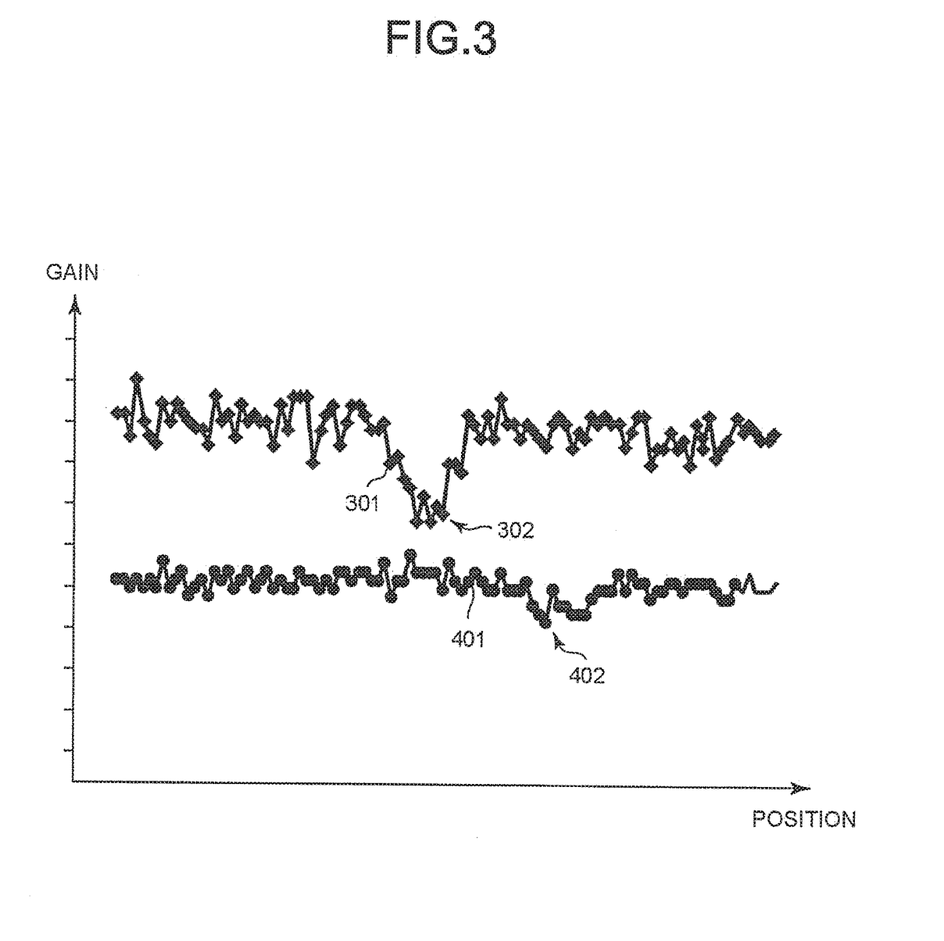
FIG. 3 is a graph illustrating an example of a gain acquired by a CCD sensor according to the embodiment.

FIG. 3 is a graph illustrating the examples of the white reference data and the distortion detection data.

The vertical axis of FIG. 3 indicates the gain. The horizontal axis of FIG. 3 indicates the position in the main scanning direction in which the image is acquired.

A graph 301 indicates the white reference data. The graph 301 includes a point 302 on the mountainside. The point 302 is the point into which the gain falls. In other words, the point 302 is the position of the foreign matter such as rubbish in the white reference data.

A graph 401 indicates the distortion detection data. The graph 401 includes a point 402 on the mountainside. The point 402 is the point into which the gain falls. In other words, the point 402 is the position of the foreign matter such as rubbish in the distortion detection data.

Next, an example of operations of the processing IC 101 is described.

Figure 4:
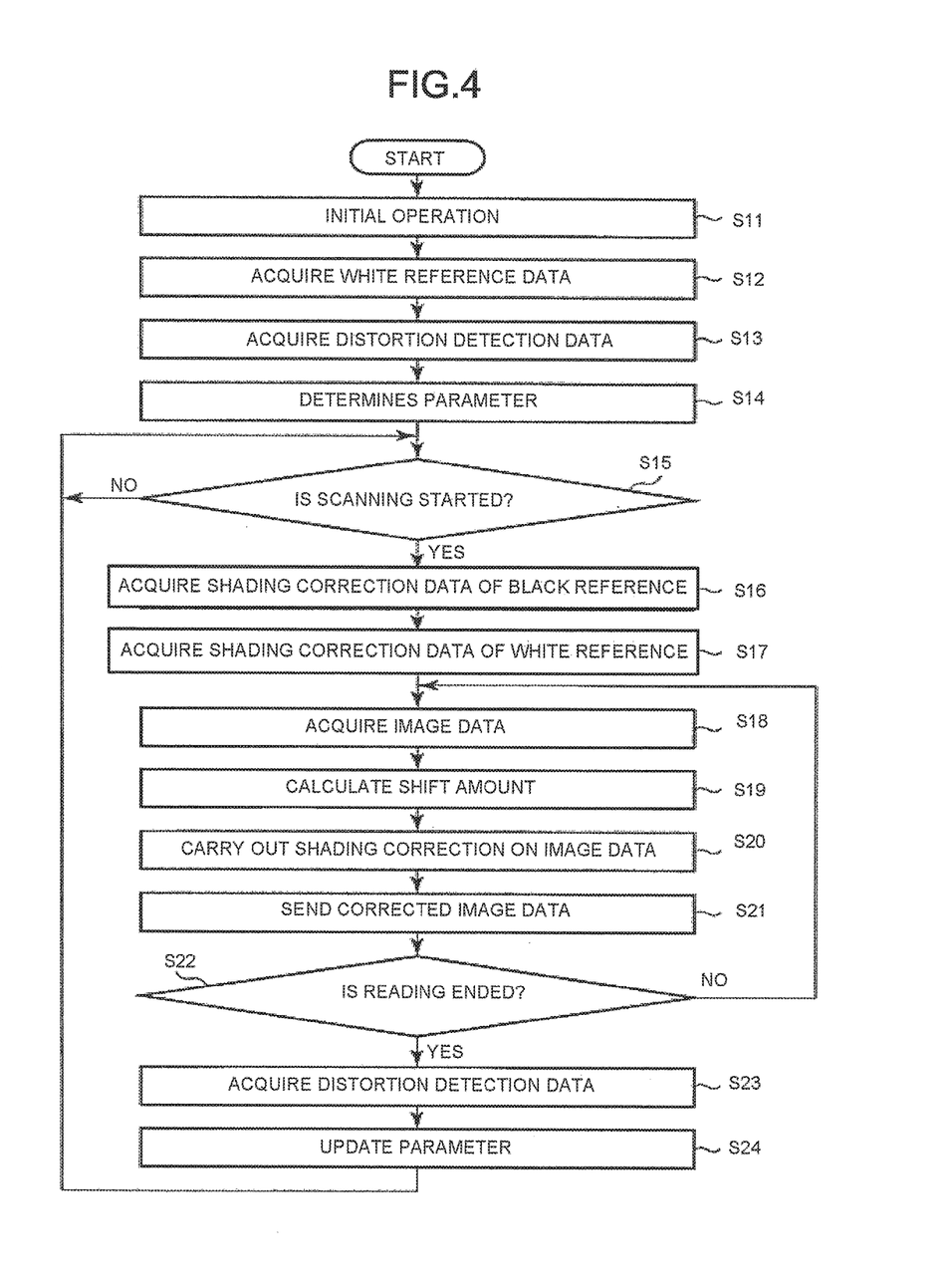
FIG. 4 is a flowchart illustrating an example of operations of the image reading apparatus according to the embodiment.

FIG. 4 is a flowchart illustrating the example of the operations of the processing IC 101.

Herein, a power supply of the image reading apparatus 1 is switched from off state to on state.

Firstly, the processing IC 101 carries out an initial operation (ACT S11). For example, the processing IC 101 carries out energization to each section of the image reading apparatus 1 or an operation check of each section as the initial operation.

If the initial operation is carried out, the processing IC 101 reads the white reference plate 30 to acquire the white reference data (ACT S12). If the white reference data is acquired, the processing IC 101 reads the distortion detection plate 40 to acquire the distortion detection data (ACT S13).

If the distortion detection data is acquired, the processing IC 101 determines the parameter for shifting the shading correction data of the shading correction on the basis of the white reference data and the distortion detection data (ACT S14).

If the parameter is determined, the processing IC 101 determines whether or not scanning is started (ACT S15). For example, the processing IC 101 determines whether to receive the operation of starting the scanning through an operation section.

If it is determined that the scanning is not started (NO in ACT S15), the processing IC 101 returns to the processing in ACT S15.

If it is determined that the scanning is started (YES in ACT S15), the processing IC 101 reads the predetermined area after the light source 51 is turned off to acquire the shading correction data of black reference as the shading correction data (ACT S16).

If the shading correction data of black reference is acquired, the processing IC 101 reads the white reference plate 30 after the light source 51 is turned on to acquire the shading correction data of white reference as the shading correction data (ACT S17). If the shading correction data of white reference is acquired, the processing IC 101 acquires the image data (ACT S18).

If the image data is acquired, the processing IC 101 calculates the shift amount on the basis of the parameter (ACT S19). If the shift amount is calculated, the processing IC 101 carries out the shading correction on the image data on the basis of the shading correction data shifted according to the shift amount (ACT S20). If the shading correction is carried out on the image data, the processing IC 101 sends the image data after the shading correction to another configuration through the image processing circuit 102 (ACT S21).

If the image data after the shading correction is sent to another configuration, the processing IC 101 determines whether or not the reading of the image data is ended (ACT S22). For example, the processing IC 101 determines whether or not the first carriage 71 moves to a predetermined end position.

If it is determined that the reading of the image data is not ended (NO in ACT S22), the processing IC 101 returns to the processing in ACT S18. For example, the processing IC 101 returns to the processing in ACT S18 after standby for a time for which the first carriage 71 moves at a predetermined distance.

If it is determined that the reading of the image data is ended (YES in ACT S22), the processing IC 101 reads the distortion detection plate 40 to acquire the distortion detection data (ACT S23). For example, the processing IC 101 enables the first carriage 71 to continuously move towards the A direction to read the distortion detection plate 40 after the reading on the document 2 is ended.

If the distortion detection data is acquired, the processing IC 101 updates the parameter on the basis of the shading correction data of white reference acquired in the processing in ACT S17 and the distortion detection data acquired in the processing in ACT S22 (ACT S24). For example, the processing IC 101 uses the shading correction data of white reference acquired in the processing in ACT S17 as the white reference data. The processing IC 101 determines the parameter on the basis of the white reference data acquired in the processing in ACT S17 and the distortion detection data acquired in the processing in ACT S22 to store the determined parameter in the line memory circuit 105.

If the parameter is updated, the processing IC 101 returns to the processing in ACT S15.

Furthermore, the processing IC 101 may not carry out the processing in ACT S23 and ACT S24. In other words, the processing IC 101 executes the processing from ACT S12 to ACT S14 at the time the power supply is turned on and may not update the parameter in operation.

The processing IC 101 may execute the processing from ACT S12 to ACT S14 at a predetermined interval. Further, the processing IC 101 may execute the processing from ACT S12 to ACT S14 in a case of receiving a predetermined operation through the operation section.

The image reading apparatus 1 is equipped with the carriage including an optical sensor formed in the main scanning direction and may be equipped with a device for enabling the carriage to move in the sub-scanning direction.

The image reading apparatus constituted as stated above reads the white reference plate to acquire the white reference data and reads the distortion detection plate to acquire the distortion detection data. The image reading apparatus determines the parameter for correcting distortion generated between the white reference plate and the distortion detection plate on the basis of the white reference data and the distortion detection data.

The image reading apparatus calculates the shift amount corresponding to the position of the first carriage on the basis of the parameter. The image reading apparatus shifts the shading correction data according to the shift amount to carry out the shading correction on the image data. As a result, the image reading apparatus can properly carry out the shading correction even if the concave position of the gain due to the distortion of the housing changes depending on the position of the first carriage.

Further, the image reading apparatus expands the width of the moving average carried out on the shading correction data as the first carriage advances to the terminal. As the first carriage advances, there is a case in which the deviation between the concave position of the gain of the image data and the position at which the shading correction corrects the dent becomes large. In such a case, the image reading apparatus can gradually carry out the correction of the dent with the shading correction. As a result, the image reading apparatus can reduce generated defects of the image data with the shading correction.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image reading apparatus, comprising:
   a sensor configured to read an image in a main scanning direction;
   a first reference plate positioned in the main scanning direction;
   a second reference plate positioned in the main scanning direction at a position different from the first reference plate in a sub-scanning direction orthogonal to the main scanning direction; and
   a processor configured to
      determine a parameter for shifting shading correction data on the basis of first reference data obtained through reading on the first reference plate by the sensor and second reference data obtained through reading on the second reference plate by the sensor,
      set the shading correction data on the basis of data obtained through the reading on the first reference plate by the sensor,
      acquire image data at each reading position in the sub-scanning direction by the sensor, and
      carry out shading correction on the image data on the basis of the shading correction data shifted according to a shift amount at the each reading position obtained from the parameter, wherein
   the processor carries out a moving average on the shading correction data to carry out the shading correction on the image on the basis of the shading correction data to which the moving average is carried out.

2. The image reading apparatus according to claim 1, wherein
   the processor enlarges a width of the moving average as the position of the image data is close to the second reference plate.

3. The image reading apparatus according to claim 2, wherein
   the processor sets a width identical to or larger than the shift amount as the width of the moving average.

4. An image reading method, comprising:
   determining a parameter for shifting shading correction data on a basis of first reference data obtained through reading on a first reference plate formed in a main scanning direction by a sensor that reads an image in the main scanning direction and second reference data obtained through reading on a second reference plate formed in the main scanning direction at a position different from the first reference plate in a sub-scanning direction orthogonal to the main scanning direction by the sensor;

setting the shading correction data on the basis of data obtained through the reading on the first reference plate by the sensor;

acquiring image data at each reading position in the sub-scanning direction by the sensor;

carrying out shading correction on the image data on the basis of the shading correction data shifted according to a shift amount at the each reading position obtained from the parameter; and carrying out a moving average on the shading correction data to carry out the shading correction on the image on the basis of the shading correction data to which the moving average is carried out.

5. The image reading method according to claim 4, wherein the parameter comprises a parameter for realizing linear deviation of a position of foreign matter in the image data from the distance between a foreign matter position of a white reference plate and a foreign matter position of a distortion detection plate while a carriage moves between the white reference plate and the distortion detection plate.

6. The image reading method according to claim 4, wherein the parameter comprises linearly combining a foreign matter position of a white reference plate and a foreign matter position of a distortion detection plate.

7. The image reading method according to claim 4, wherein the shading correction data comprises shading correction data of a white reference and shading correction data of a black reference.

* * * * *